US010025466B2

(12) United States Patent
Santos-Gomez (10) Patent No.: US 10,025,466 B2
(45) Date of Patent: Jul. 17, 2018

(54) DYNAMICALLY TRANSFORMING A TABULAR OBJECT BASED ON ACTIONS WITHIN A GRAPHICAL USER INTERFACE (71) Applicant: International Business Machines Corporation, Armonk, NY (US)

(72) Inventor: Lucinio Santos-Gomez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 14/736,457

(22) Filed: Jun. 11, 2015

(65) Prior Publication Data
US 2016/0364099 A1 Dec. 15, 2016

(51) Int. Cl.
*G06F 3/0483* (2013.01)
*G06F 3/0484* (2013.01)
*G06F 3/0485* (2013.01)
*G06F 17/21* (2006.01)
*G06F 17/24* (2006.01)

(52) U.S. Cl.
CPC .......... *G06F 3/0483* (2013.01); *G06F 3/0485* (2013.01); *G06F 3/04847* (2013.01); *G06F 17/211* (2013.01); *G06F 17/245* (2013.01)

(58) Field of Classification Search
CPC .. G06F 3/0483; G06F 3/04847; G06F 3/0485; G06F 17/211; G06F 17/245
See application file for complete search history.

(56) References Cited

U.S. PATENT DOCUMENTS

| 6,085,202 | A | 7/2000 | Rao et al. |
| 6,199,080 | B1* | 3/2001 | Nielsen ............. G06F 17/30899 707/E17.119 |
| 6,313,848 | B1* | 11/2001 | Hoag .................... G06F 17/217 345/684 |
| 6,377,285 | B1 | 4/2002 | Doan et al. |
| 2004/0002985 | A1* | 1/2004 | Pratley .................. G06F 17/245 |
| 2004/0056894 | A1* | 3/2004 | Zaika .................... G06F 9/4448 715/762 |

(Continued)

OTHER PUBLICATIONS

Anonymously; "A JSON Driven Rendering Engine of General Statistic Table"; An ip.com Prior Art Database Technical Disclosure; http://ip.conn/IPCOM/000233284; Dec. 5, 2013.

(Continued)

*Primary Examiner* — Eric J Bycer
(74) *Attorney, Agent, or Firm* — Daniel Simek; Edell, Shapiro & Finnan, LLC (57) ABSTRACT

According to one embodiment of the present invention, a computer system comprising at least one processor may generate a tabular object containing data about an object. The layout of such tabular object comprises rows and columns, and may have a structure that includes plural sets of dual columns, each set representing pairs of related data (e.g. property value pairs). The size and portion of the tabular object in view at any particular time are determined by the user's sizing and scrolling behavior. The assignment of object data (e.g., property value pairs) to the resulting cells in that tabular object takes place dynamically according to the size and portion of the tabular object being displayed at any particular time in a manner that optimizes the use of available space.

20 Claims, 9 Drawing Sheets

(56) References Cited

U.S. PATENT DOCUMENTS

| | | | | |
|---|---|---|---|---|
| 2004/0268269 A1* | 12/2004 | Breinberg | ............... | G06F 8/38 |
| | | | | 715/851 |
| 2006/0212825 A1* | 9/2006 | Taylor | ............... | G06F 3/0481 |
| | | | | 715/788 |
| 2009/0040240 A1* | 2/2009 | Grotjohn | ............... | G06F 3/0481 |
| | | | | 345/689 |
| 2009/0089662 A1* | 4/2009 | Wulkan | ............... | G06F 17/245 |
| | | | | 715/245 |
| 2010/0332379 A1 | 12/2010 | Ram | | |
| 2015/0012408 A1 | 1/2015 | Ram | | |
| 2016/0162448 A1* | 6/2016 | Wang | ............... | G06F 17/212 |
| | | | | 715/236 |

OTHER PUBLICATIONS

IBM et al.; "Graphical Procedural Capability"; An ip.com Prior Art Database Technical Disclosure; http://ip.com/IPCOM/000120309; Apr. 2, 2005.

\* cited by examiner

| Properties | | | | |
|---|---|---|---|---|
| Property 1 | Value 1 | Property 5 | Value 5 | △ |
| Property 2 | Value 2 | Property 6 | Value 6 | |
| Property 3 | Value 3 | Property 7 | Value 7 | |
| Property 4 | Value 4 | Property 8 | Value 8 | ▽ |

FIG.5B

| Properties | | | | |
|---|---|---|---|---|
| Property 2 | Value 2 | Property 6 | Value 6 | △ |
| Property 3 | Value 3 | Property 7 | Value 7 | |
| Property 4 | Value 4 | Property 8 | Value 8 | |
| Property 5 | Value 5 | Property 9 | Value 9 | ▽ |

FIG.5C

| Properties | | | | |
|---|---|---|---|---|
| Property 1 | Value 1 | Property 5 | Value 5 | △ |
| Property 2 | Value 2 | Property 6 | Value 6 | |
| Property 3 | Value 3 | Property 7 | Value 7 | |
| Property 4 | Value 4 | Property 8 | Value 8 | ▽ |

FIG.6A

| Properties | | | |
|---|---|---|---|
| Property 1 | Value 1 | Property 5 | Value 5 |
| Property 2 | Value 2 | Property 6 | Value 6 |
| Property 3 | Value 3 | Property 7 | Value 7 |
| Property 4 | Value 4 | Property 8 | Value 8 |

FIG.6B

| Properties | | | | | |
|---|---|---|---|---|---|
| Property 1 | Value 1 | Property 5 | Value 5 | Property 9 | Value 9 |
| Property 2 | Value 2 | Property 6 | Value 6 | Property 10 | Value 10 |
| Property 3 | Value 3 | Property 7 | Value 7 | Property 11 | Value 11 |
| Property 4 | Value 4 | Property 8 | Value 8 | Property 12 | Value 12 |

FIG.6C

| Properties | | | | | | |
|---|---|---|---|---|---|---|
| Property 1 | Value 1 | Property 5 | Value 5 | Property 9 | Value 9 | Prope |
| Property 2 | Value 2 | Property 6 | Value 6 | Property 10 | Value 10 | Prope |
| Property 3 | Value 3 | Property 7 | Value 7 | Property 11 | Value 11 | Prope |
| Property 4 | Value 4 | Property 8 | Value 8 | Property 12 | Value 12 | Prope |

| Grid | | | | | | | |
|------|---------|-----------|-----------|------------|-----------|-----------|
| | Property 1 | Value 1-1 | Value 1-2 | Property 5 | Value 5-1 | Value 5-2 |
| | Property 2 | Value 2-1 | Value 2-2 | Property 6 | Value 6-1 | Value 6-2 |
| | Property 3 | Value 3-1 | Value 3-2 | Property 7 | Value 7-1 | Value 7-2 |
| | Property 4 | Value 4-1 | Value 4-2 | Property 8 | Value 8-1 | Value 8-2 |

DYNAMICALLY TRANSFORMING A TABULAR OBJECT BASED ON ACTIONS WITHIN A GRAPHICAL USER INTERFACE

BACKGROUND

1. Technical Field

Present invention embodiments relate to presenting interfaces of computing devices, and more specifically, to manipulating and transforming a tabular object of a user interface of a computing device based on actions within that interface.

2. Discussion of the Related Art

Modern computing devices normally have a user interface to display information to a user. The information may include tabular objects that are not very flexible to be adjusted to fully utilize the available space of the user interface. For example, software authoring tools (e.g., Integrated Design Environments (IDEs), modeling tools) make extensive use of property grids, usually as part of a larger multi-pane arrangement, but sometimes as floating widgets. Property grids typically display object properties as property-value pairs (a property name and its value). The basic structure of a property grid usually conforms to a rigid table/grid format, which can be very inflexible and inefficient if there is limited vertical or horizontal display space.

SUMMARY

According to one embodiment of the present invention, a system may manipulate states of a tabular object. The system may comprise a computer system including at least one processor. The system may receive data for the tabular object and generate the tabular object by organizing the data into rows and columns for a display according to a size of an available portion of the display. The tabular object may have a structure that includes plural sets of columns with each set comprising a plurality of columns of data items. Once generated, the system may present the tabular object in the available portion of the display.

BRIEF DESCRIPTION OF THE DRAWINGS

Generally, like reference numerals in the various figures are utilized to designate like components.

DETAILED DESCRIPTION

Present invention embodiments present a tabular object on a user interface. The tabular object may be a wrappable grid to display data items in a tabular manner. In contrast to a conventional grid or table that only provides scrolling for more rows of data in a vertical direction, the tabular object according to an embodiment of the present invention may display sets of columns of data spanned in a horizontal direction. For example, in a tool that shows properties of objects, the properties may be shown in a property grid in property-value pairs. According to an embodiment of the present invention a property grid may present property-value pairs in sets of paired columns, so that the sets of paired columns may be presented in parallel and spanned in a horizontal direction to make the most use of horizontal space available on a user interface. Moreover, the state of the tabular object may be adjusted in response to manipulation of a container (or parent) tabular object and/or actuators, such as boundaries separating columns, boundaries of the tabular object, scroll bars, etc.

Figure 1:
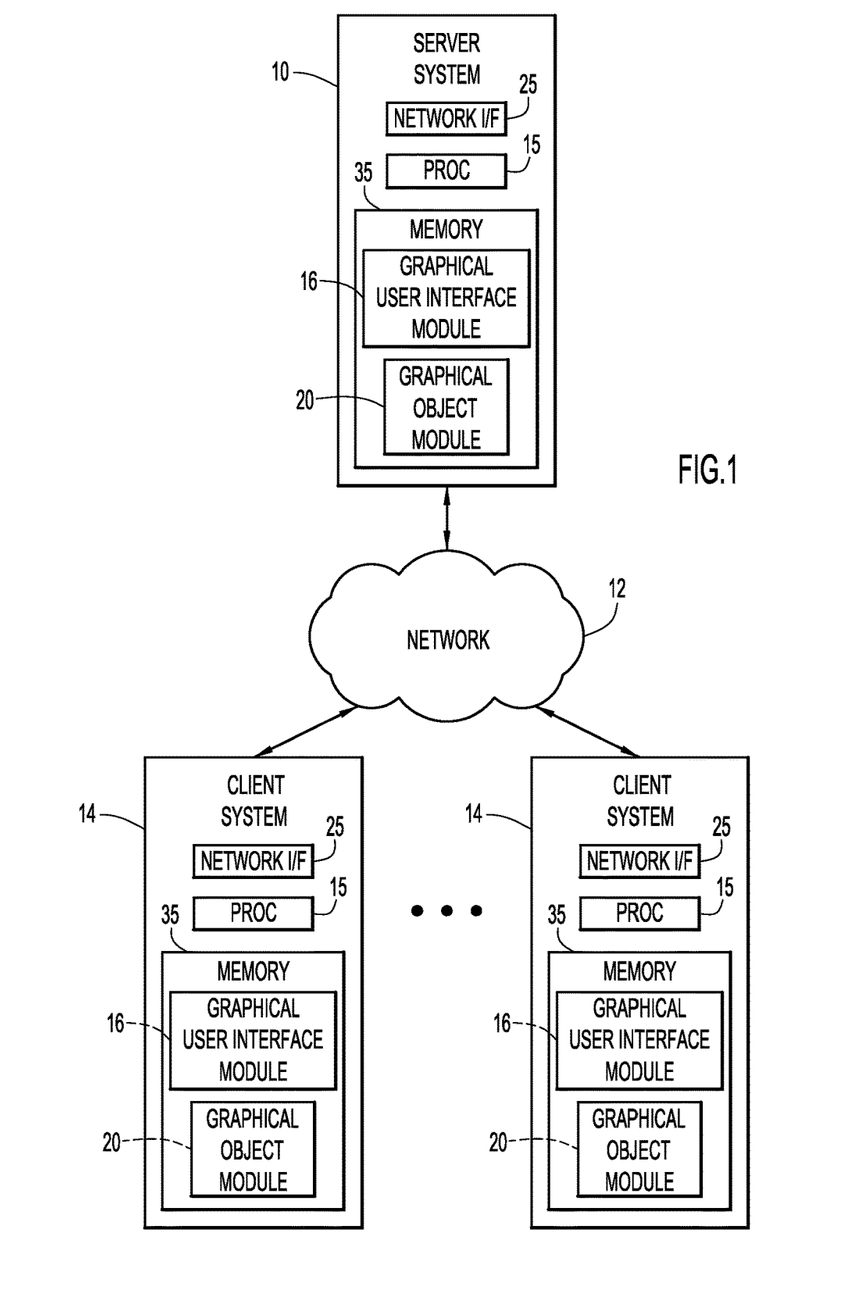
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client or end-user systems 14, such as the one server system 10 and two client systems 14 shown in FIG. 1. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, module, browser/interface software, etc.).

The client systems may use a graphical user interface (e.g., GUI, etc.) to present one or more tabular objects to users and solicit input from users pertaining to adjustments of one or more tabular objects on the graphical user interface. In some embodiments, the server system 10 may also have a monitor attached to them such that the server system 10 may also have a graphical user interface.

Each of the server systems 10 and client systems 14 may comprise a graphical user interface module 16 and a tabular object module 20. The graphical user interface module 16 may include data and logic regarding presenting the GUI on a monitor. In some embodiments, the graphical user interface module 16 may be part of an operating system that controls the server systems 10 and client systems 14. The tabular object module 20 may include data and logic regarding presenting tabular objects on the GUI. In some embodiments, the tabular object module 20 of the server systems 10 may be part of a software application being executed on the server systems 10 and the tabular object module 20 of the server systems 10 may be part of a software application being executed on the client systems 14. In one embodiment, for example, an authoring tool (e.g., an IDE) may be a web-based application such that one the server system 10 may host the website and the client systems 14 may be used to access the application. The server system 10 may generate an initial definition of a tabular object (e.g., a table or grid defined in HTML) and send the initial definition to the client systems 14. The initial definition may be stored by the tabular object module 20 on the server systems 10 when it is generated and stored by the tabular object module 20 on the client systems 14 when it is received for rendering. In this example, in addition to the definition of the tabular object, the tabular object module 20 may also include logic to manipulate the tabular object, on the server systems 10, the client systems 14, or both.

In another embodiment, the tabular object module 20 may be part of a desktop software application. In such an embodiment, the tabular object module 20 may store the definition of tabular objects and logic to manipulate the tabular objects only on the computer system in which the desktop software application is being executed.

The graphical user interface module 16 and tabular object module 20 may include one or more modules and/or units to perform the various functions of present invention embodiments described below. The various modules (e.g., graphical user interface module, tabular object module, etc.) and/or units may be implemented by any combination of any quantity of software and/or hardware modules or units, and may reside within memory 35 of the server and/or client systems for execution by processor 15.

Figure 2:
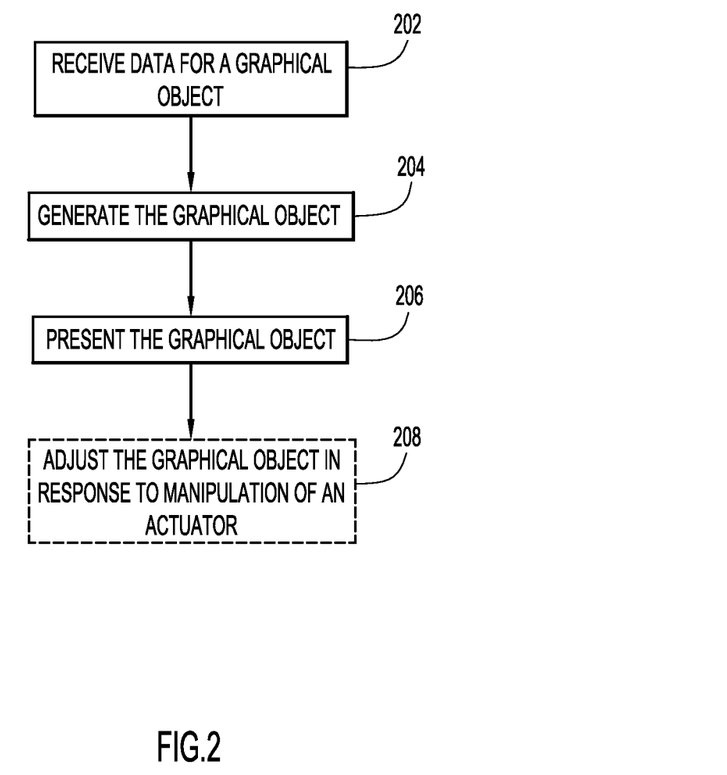
FIG. 2 is a procedural flow chart illustrating a manner in which a tabular object may be generated according to an embodiment of the present invention.

FIG. 2 is a generalized flowchart of a method 200 for manipulating states of a tabular object according to embodiments of the present invention. The method 200 may start at block 202, at which data for a tabular object may be retrieved. For example, data for a tabular object may be stored in a local disk of one client system 14 or a network shared drive (e.g., a hard drive attached to the server systems 10 or another client system 14) and the client system 14 may retrieve data for the tabular object from the storage. In another example, data for a tabular object may be generated on a server system 10, for example, as part of a web page in the memory 35 of the server system 10, and the client system 14 may retrieve data for the tabular object from the memory 35 of the server system 10.

At block 204, the tabular object may be generated. The tabular object may include a grid structure for a display according to a size of an available portion of the display. The display may be, for example, a graphical user interface (GUI) displayed on a monitor. In one embodiment, the grid structure may organize data associated with one entry into a plurality of columns, and organize multiple entries into parallel sets of columns. The tabular object may be presented on an available portion of a display at block 206.

Figure 3:
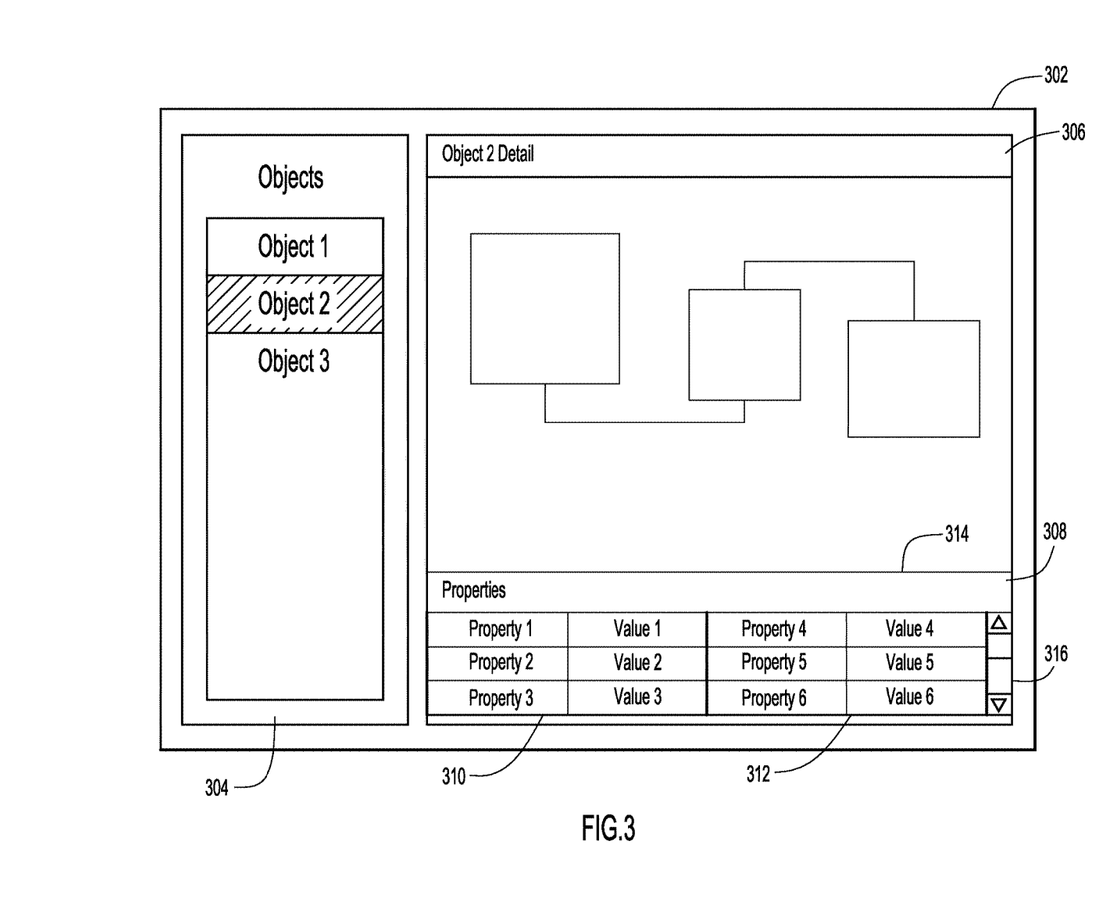
FIG. 3 is a schematic illustration of an example tabular object on a graphical user interface (GUI) according to an embodiment of the present invention.

FIG. 3 shows one tabular object 308 on an exemplary graphical user interface (GUI) according to an embodiment of the present invention. The graphical user interface may comprise a multi-pane window 302 that has a first pane 304 and a second pane 306. As a non-limiting example, the window 302 may be a user interface of an authoring tool (e.g., an integrated development (or design) environment (IDE)), which may be a browser based (e.g., showing HTML or gadgets embedded on a web page), or a desktop application. The pane 304 may display a plurality of objects that may be selected. The pane 306 may display the details of a selected object. In the example shown on FIG. 3, Object 2 on the pane 304 may be selected and thus, its details may be shown on the pane 306.

The pane 306 may comprise a tabular object 308 to display textual information. The tabular object 308 may be an embodiment of a wrappable grid and may comprise a plurality of entries organized into rows and columns. Shown as a non-limiting example, the tabular object 308 may be a property grid to show information for object properties. Each entry of a property value may comprise two data items (shown on two columns), for example, "property 1" and "value 1," "property 2" and "value 2," etc. In one embodiment, the tabular object 308 may comprise a plurality of records of object properties such that these records may not fit into one set of columns (e.g., from top to bottom in the set of columns 310). Thus, the tabular object 308 may comprise a plurality of sets of columns, such as the set of columns 310 and the set of columns 312. Each set of columns 310 and 312 may comprise multiple entries to display the records of object properties. After the available entries of the set of columns 310 are exhausted, the remaining records may be displayed by the entries of the set of columns 312, also in a top to bottom direction. It should be noted that the tabular object 308 may include more records than displayed by the sets of columns 310 and 312.

In at least one embodiment, the tabular object 308 may be automatically adjusted to fit in the available space on the GUI. For example, as shown in FIG. 3, the set of columns 312 may comprise columns (e.g., "value 4," "value 5," and "value 6") that may be wider (e.g., compared to "value 1," "value 2," and "value 3") to fit in the available space on the GUI.

The tabular object 308 may comprise four boundaries: left, right, upper, and lower. Each of the boundaries may be adjusted by a user, for example, left and right boundaries may be dragged drag left or right, upper and lower boundaries may be dragged up or down. For illustration, only an upper bound 314 is labeled. The tabular object 308 may also comprise optional scroll bars, for example, at bottom for horizontal scroll and at right for vertical scroll (e.g., scroll bar 316). A scroll bar may needed only when the tabular object 308 does not display all records of object properties on the available portion of the GUI. For example, the tabular object 308 may comprise more records than what's shown on FIG. 2 and thus, may comprise a vertical scroll bar 316 on the right side. The vertical scroll bar 316 may include a bar (also referred to as a thumb) and up and down control arrows. For embodiments in which a wrappable grid has a horizontal scroll bar, the horizontal scroll bar may comprise a bar, and left and right control arrows.

Referring back to FIG. 2, the method 200 may comprise an optional block 208 (shown in phantom), at which the state of the tabular object may be adjusted in response to manipulation of an actuator. For example, the tabular object 308 may be dynamically adjusted by a user manipulation of an actuator on the graphical user interface. Exemplary manipulation may include resizing the multi-pane window 302 (e.g., by clicking on a resize button of the window (not shown) or dragging one or more boundaries of the window) if the tabular object 308 is anchored to the multi-pane window 302, resizing the pane 306 (e.g., by clicking on a resize button of the pane (not shown) or dragging one or more the boundaries of the pane) if the tabular object 308 is anchored to the pane 306, resizing the tabular object 308 (e.g., by clicking a resize button of the grid (not shown) or dragging the boundaries of the grid, such as the upper boundary 314), scrolling the entries of the tabular object 308 (e.g., by dragging the bar of the scroll bar, or clicking on the control arrows of the scroll bar).

Figure 4:
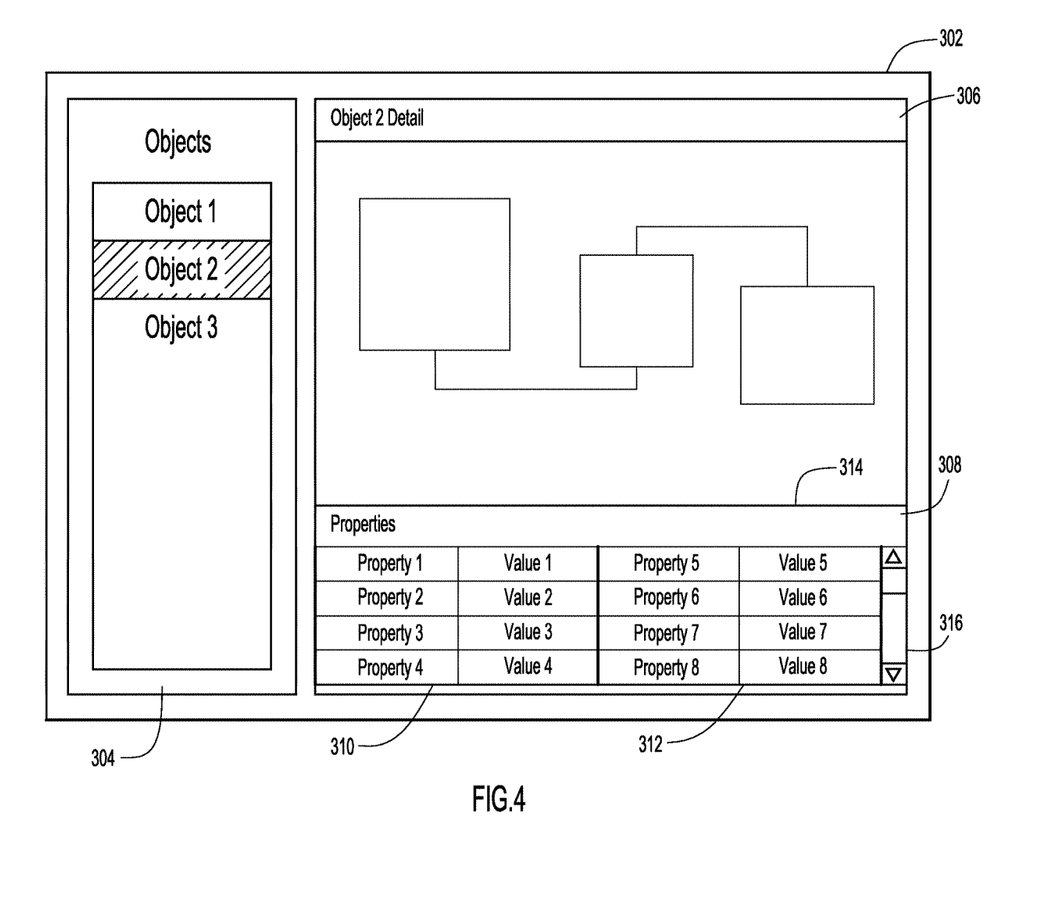
FIG. 4 is a schematic illustration of one implementation of the height of an example tabular object being adjusted according to an embodiment of the present invention.

FIG. 4 illustrates one example in which the state of an example tabular object may be adjusted according to an embodiment of the present invention. For example, a user may drag the upper boundary 314 of the tabular object 308 upwards and thus, the tabular object 308 may have more vertical space to display more entries. In contrast to the columns 310 and 312 of the tabular object 308 shown on FIG. 3, each set of columns 310 and 312 of the tabular object 308 on FIG. 4 may comprise 4 rows of entries.

Figure 5A:
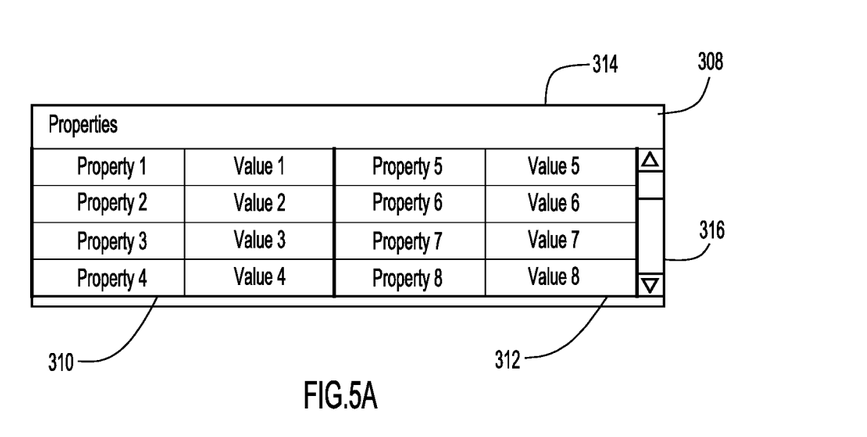
FIGS. 5A, 5B and 5C are generalized schematic illustrations of one implementation of the content being displayed by an example tabular object being adjusted according to an embodiment of the present invention.
Figure 5B:
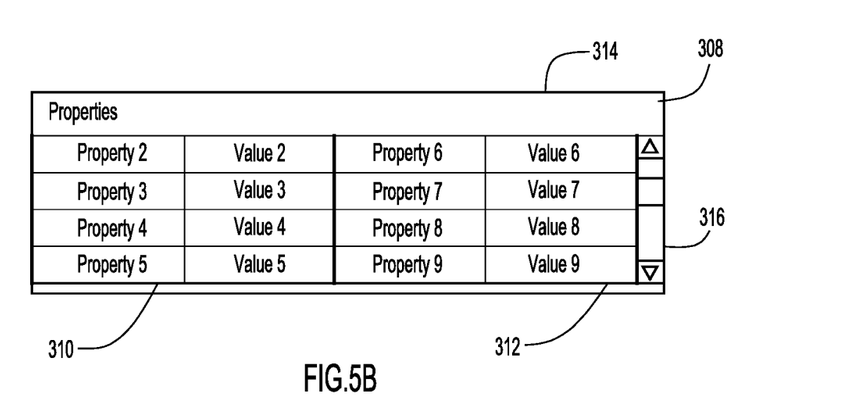

FIGS. 5A, 5B and 5C illustrate another example in which the state of an example tabular object may be adjusted according to an embodiment of the present invention. FIG. 5A shows a starting scroll state of the tabular object 308 (e.g., properties 1-4 and 5-8 in respective sets of columns 310, 312). FIG. 5B shows the tabular object 308 may be scrolled down by one entry, for example, by dragging the bar of the scroll bar 316, or by clicking on the down arrow of the scroll bar 316 (e.g., properties 2-5 and 6-9 in respective sets of columns 310, 312). As shown in FIG. 5A, each property-value pair row may have a position and the position sequence may traverse positions of a first set of columns (e.g., set of columns 310) prior to traversing positions of another set of columns (e.g., set of columns 312) within the tabular object 308. In response to the scrolling operation, as shown in FIG. 5B, the position of one or more rows may be adjusted. Moreover, the position of each adjusted row may be identified in accordance with a position sequence including traversing positions of a current set of columns prior to traversing positions of another set of columns within the tabular object. It should be noted that the adjusting maintains the same order of rows within the tabular object 308. In some embodiments, a quantity of rows becoming visible and hidden within the tabular object 308 due to the adjusting may be proportional to a quantity of the sets of columns in the tabular object 308.

Figure 5C:
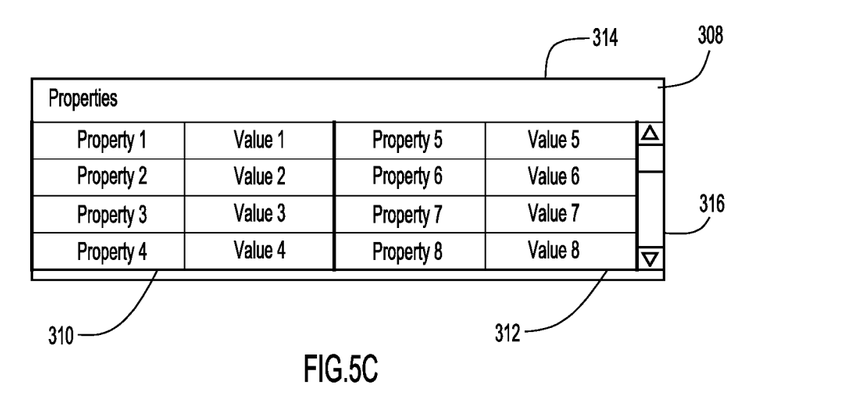

FIG. 5C shows the tabular object 308 may be scrolled back to the starting scroll state, for example, by dragging the bar of the scroll bar 316, or by clicking on the up arrow of the scroll bar 316.

Figure 6A:
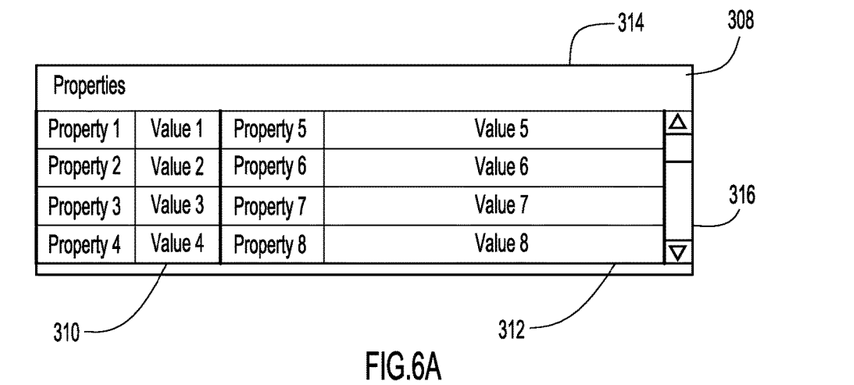
FIGS. 6A, 6B and 6C are generalized schematic illustrations of one implementation of the column width of an example tabular object being adjusted according to an embodiment of the present invention.
Figure 6B:
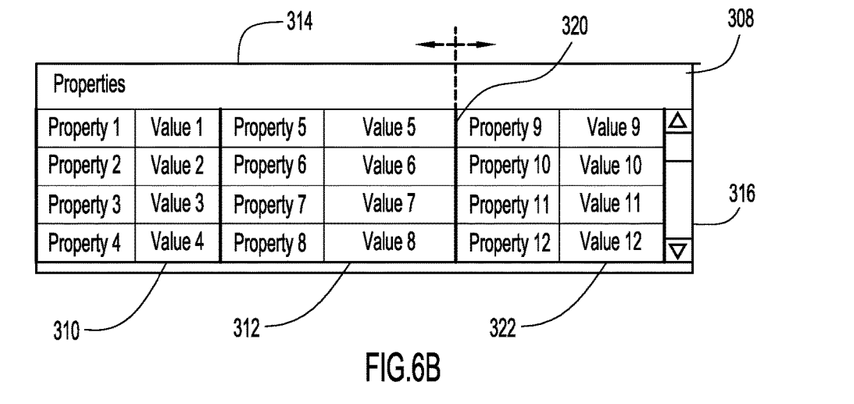
Figure 6C:
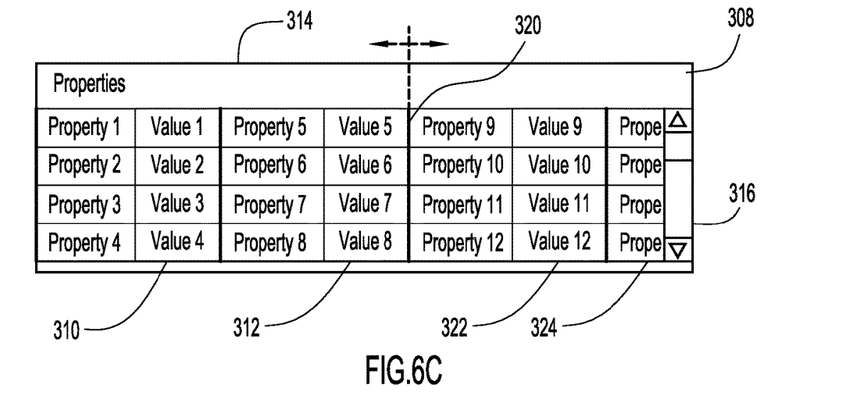

FIGS. 6A, 6B and 6C illustrate another example in which the state of an example tabular object may be adjusted according to an embodiment of the present invention. FIG. 6A shows that because the available portion of the display may be wide, the set of columns 312 may be wider than the set of columns 310 of the tabular object 308. For example, the "value" column of the set of columns 312 may be wider than the "value" column of the set of columns 310. FIG. 6B shows that a column boundary 320 of the set of columns 312 may be dragged such that the position of the column boundary 320 may be adjusted. Because of this adjustment, a new set of columns 322 may be added on the right of the set of columns 312 to show more entries (e.g., properties 9-12) of the tabular object 308. FIG. 6C shows that the column boundary 320 may be dragged towards the left further and another set of columns 324 may start to appear on the right of the set of columns 322. It should be noted that although only the column boundary 320 is labeled and described, each column boundary of the tabular object 308 may be adjustable as the column boundary 320.

Figure 7:
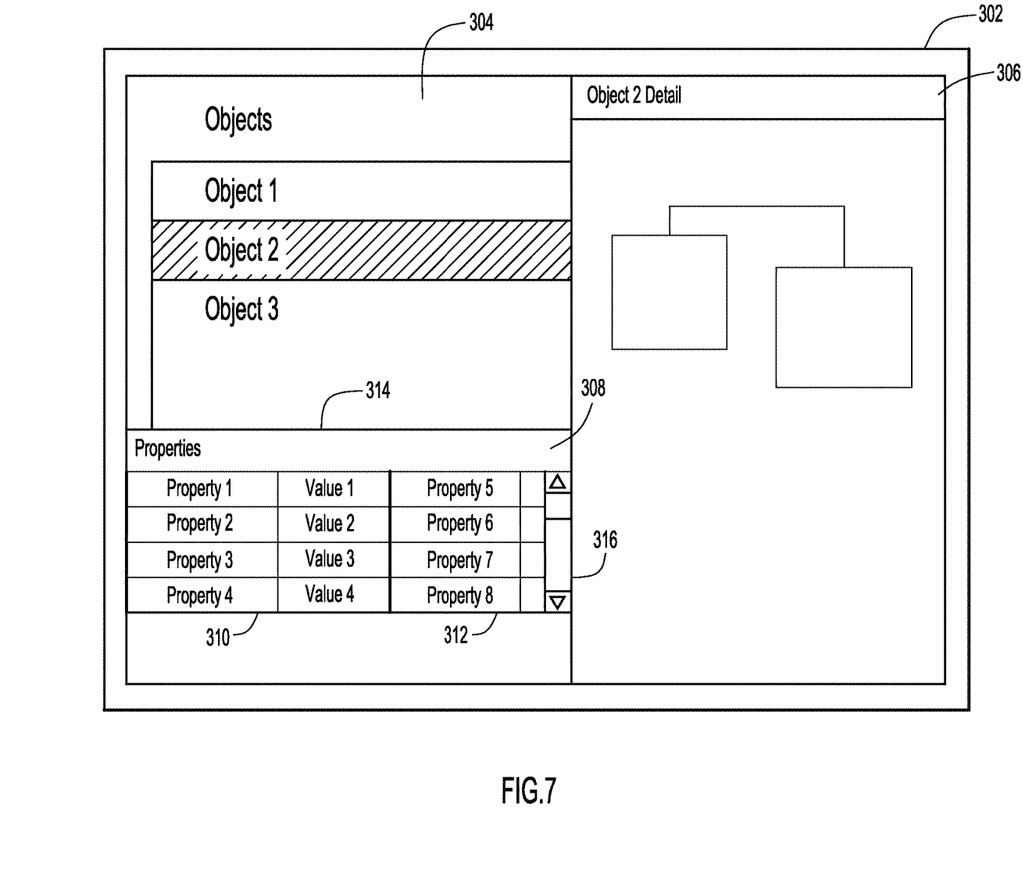
FIG. 7 is a schematic illustration of an example tabular object to be associated with a different pane on a user interface according to another embodiment of the present invention.
Figure 8:
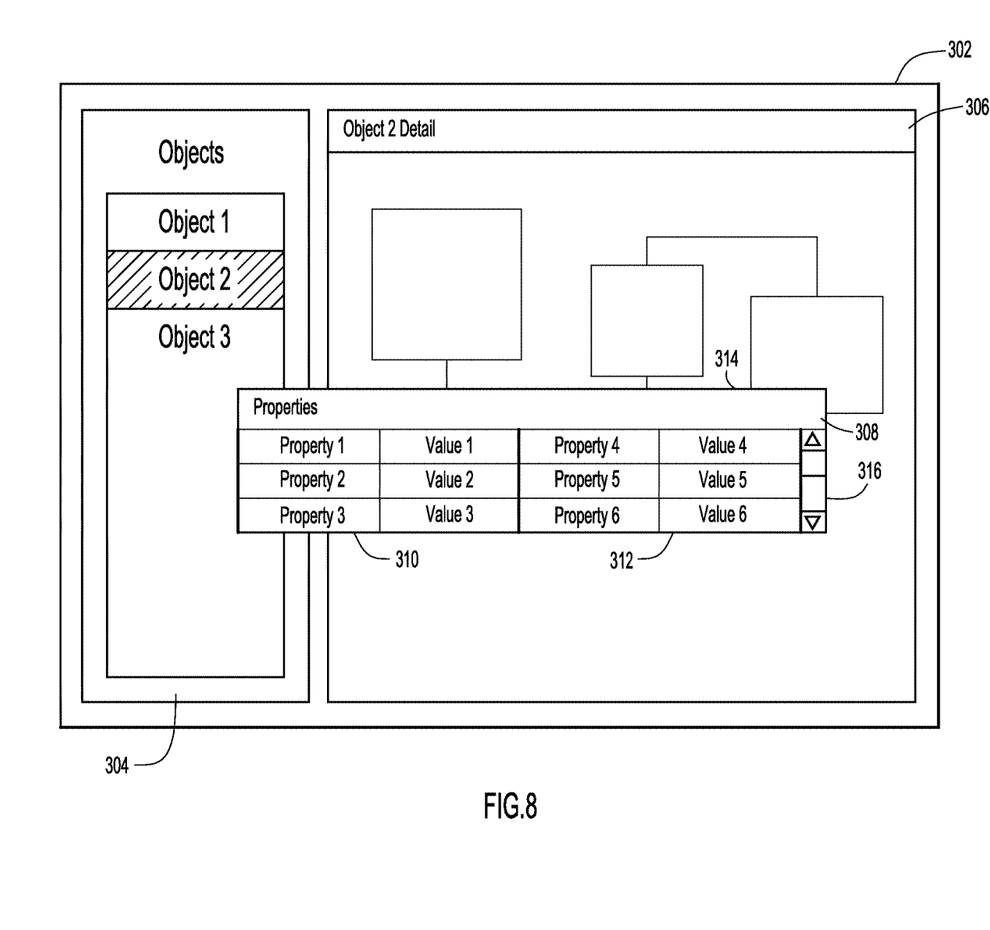
FIG. 8 is a schematic illustration of an example tabular object floating on a graphical user interface according to another embodiment of the present invention.

FIGS. 3 and 4 show that the tabular object 308 may be positioned below the pane 306. A tabular object according to an embodiment of the present invention may be positioned near any pane or window. For example, FIG. 7 illustrates that the tabular object 308 may be positioned below the pane 304 according to another embodiment of the present invention. Moreover, in some embodiments, a tabular object may reside adjacent any pane or window. For example, FIG. 8 illustrates that the tabular object 308 may be floating on the window 302 according to another embodiment of the present invention.

In some embodiments, the tabular object 308 may be anchored to a container tabular object such that one or more boundaries of the tabular object 308 may be tied to a respective boundary of the container tabular object. In such embodiments, resizing of the container tabular object may cause the state of the tabular object 308 to change. For example, if the tabular object 308 is anchored to the pane 306 or the multi-pane window 302, resizing the pane 306 or the multi-pane window 302 may cause the tabular object 308 to dynamically resize. If more (or less) vertical space becomes available, more (or less) rows may be displayed in the vertical direction. If more (or less) horizontal space becomes available, more (or less) columns may be displayed in the horizontal direction. In such cases, a position of one or more rows within the tabular object 308 may be adjusted dynamically in response to the manipulation of the container tabular object.

The change in the quantity of rows or columns displaced is based on the change in available vertical and/or horizontal space and the size of the rows and/or columns (e.g., available space divided by row or column size). The units for space and/or size may be based on any desired units (e.g., pixels, font/point size, etc.

Figure 9:
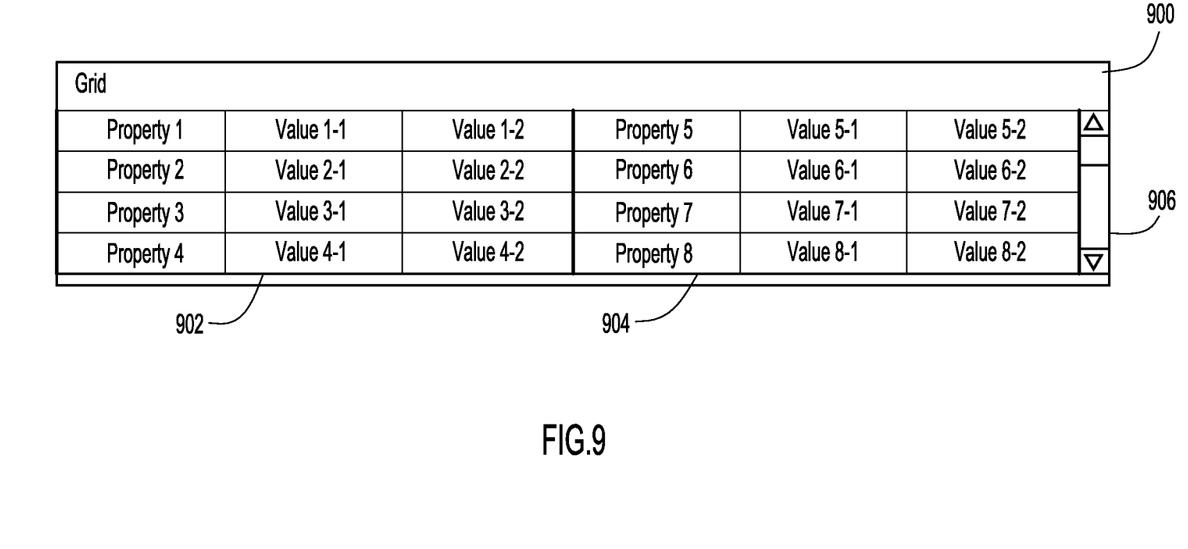
FIG. 9 is a schematic illustration of another example tabular object with additional columns in a set of columns on a graphical user interface according to another embodiment of the present invention.

The tabular object 308 shows that each entry comprises a property-value pair. In embodiments according to the present disclosure, data items for an entry are not limited to two. For example, FIG. 9 illustrates a tabular object 900 according to another embodiment of the present invention. As shown in FIG. 9, each entry may comprise three data items, for example, one property (which may be a property name) and two values for the property. The tabular object 900 may be positioned adjacent a pane or window or floating.

The entries in the tabular object 308 and tabular object 900 are shown to comprise textual phrases as data items to be presented. Other formats of data items, for example, a selection from a drop down list, a selection of radio buttons, or a selection of check boxes, may also be implemented. In addition, a grid according to an embodiment of the present disclosure may also be used to display database entries conventionally displayed in a table.

It will be appreciated that the embodiments described above and illustrated in the drawings represent only a few of the many ways of implementing embodiments for presenting a wrappable grid.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software (e.g., graphical user interface module, tabular object module) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., graphical user interface module, tabular object module) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., records of object properties). The database system may be implemented by any number of any conventional or other databases, data stores or storage structures (e.g., files, databases, data structures, data or other repositories, etc.) to store information (e.g., records of object properties). The database system may be included within or coupled to the server and/or client systems. The database systems and/or storage structures may be remote from or local to the computer or other processing systems, and may store any desired data (e.g., records of object properties).

The present invention embodiments may employ any number of any type of user interface (e.g., Graphical User Interface (GUI), command-line, prompt, etc.) for obtaining or providing information (e.g., records of object properties), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of manipulating states of a tabular object comprising:
receiving data including a plurality of entries for the tabular object;
generating the tabular object by organizing the data into rows and columns for a display according to a size of an available portion of the display, wherein a structure of the tabular object includes for each row plural sets of columns with each set comprising a same plurality of columns of data items, wherein the plural sets of columns for each row include a set of columns consecutively repeated a plurality of times, and wherein each entry for the tabular object includes data for a corresponding set of columns and each row of the tabular object comprises a different entry in each of the plural sets of columns for that row;

presenting the tabular object in the available portion of the display;
detecting manipulation of one or more elements of the display producing an alteration to the size of the available portion of the display; and
dynamically adjusting the tabular object to occupy the available portion of the display by shifting entries to form different rows of the tabular object in response to detecting the alteration to the size of the available portion of the display, wherein shifting the entries includes:
identifying a position of each entry within a sequence of the entries in the tabular object; and
traversing positions of a current set of columns of the tabular object for the entries to shift entries to another set of columns of the tabular object to occupy the available portion of the display, wherein the dynamically adjusted tabular object maintains a same order of the sequence of entries.

2. The computer-implemented method of claim 1, further comprising:
adjusting a quantity of the sets of columns in the tabular object in response to manipulation of an actuator for the tabular object.

3. The computer-implemented method of claim 1, wherein the display includes a plurality of panes, and the method further comprises:
dynamically adjusting a position of one or more rows within the tabular object in response to manipulation of one or more of the panes.

4. The computer-implemented method of claim 1, further comprising:
dynamically adjusting a position of one or more rows within the tabular object in response to manipulation of an actuator for the tabular object.

5. The computer-implemented method of claim 4, wherein:
the manipulation of the actuator provides a scrolling operation;
the position of each adjusted row is identified in accordance with a position sequence including traversing positions of a current set of columns prior to traversing positions of another set of columns within the tabular object;
the adjusting maintains the same order of rows within the tabular object; and
a quantity of rows becoming visible and hidden within the tabular object due to the adjusting is proportional to a quantity of the sets of columns in the tabular object.

6. The computer-implemented method of claim 1, wherein the tabular object is floating on the display.

7. The computer-implemented method of claim 1, wherein the tabular object includes a property grid providing property names and corresponding property values for an object within the display.

8. A system for manipulating states of a tabular object comprising:
a computer system including at least one processor configured to:
receive data including a plurality of entries for the tabular object;
generate the tabular object by organizing the data into rows and columns for a display according to a size of an available portion of the display, wherein a structure of the tabular object includes for each row plural sets of columns with each set comprising a same plurality of columns of data items, wherein the plural sets of columns for each row include a set of columns consecutively repeated a plurality of times, and wherein each entry for the tabular object includes data for a corresponding set of columns and each row of the tabular object comprises a different entry in each of the plural sets of columns for that row;
present the tabular object in the available portion of the display;
detect manipulation of one or more elements of the display producing an alteration to the size of the available portion of the display; and
dynamically adjust the tabular object to occupy the available portion of the display by shifting entries to form different rows of the tabular object in response to detecting the alteration to the size of the available portion of the display, wherein shifting the entries includes:
identifying a position of each entry within a sequence of the entries in the tabular object; and
traversing positions of a current set of columns of the tabular object for the entries to shift entries to another set of columns of the tabular object to occupy the available portion of the display, wherein the dynamically adjusted tabular object maintains a same order of the sequence of entries.

9. The system of claim 8, wherein the at least one processor is further configured to:
adjust a quantity of the sets of columns in the tabular object in response to manipulation of an actuator for the tabular object.

10. The system of claim 8, wherein the display includes a plurality of panes, and the at least one processor is further configured to:
dynamically adjust a position of one or more rows within the tabular object in response to manipulation of one or more of the panes.

11. The system of claim 8, wherein the at least one processor is further configured to:
dynamically adjust a position of one or more rows within the tabular object in response to manipulation of an actuator for the tabular object.

12. The system of claim 11, wherein:
the manipulation of the actuator provides a scrolling operation;
the position of each adjusted row is identified in accordance with a position sequence including traversing positions of a current set of columns prior to traversing positions of another set of columns within the tabular object;
the adjusting maintains the same order of rows within the tabular object; and
a quantity of rows becoming visible and hidden within the tabular object due to the adjusting is proportional to a quantity of the sets of columns in the tabular object.

13. The system of claim 8, wherein the tabular object is floating on the display.

14. The system of claim 8, wherein the tabular object includes a property grid providing property names and corresponding property values for an object within the display.

15. A computer program product for manipulating states of a tabular object comprising:
a computer readable storage medium having computer readable program code embodied therewith, the computer readable program code comprising computer executable instructions configured to:

receive data including a plurality of entries for the tabular object;

generate the tabular object by organizing the data into rows and columns for a display according to a size of an available portion of the display, wherein a structure of the tabular object includes for each row plural sets of columns with each set comprising a same plurality of columns of data items, wherein the plural sets of columns for each row include a set of columns consecutively repeated a plurality of times, and wherein each entry for the tabular object includes data for a corresponding set of columns and each row of the tabular object comprises a different entry in each of the plural sets of columns for that row;

present the tabular object in the available portion of the display;

detect manipulation of one or more elements of the display producing an alteration to the size of the available portion of the display; and dynamically adjust the tabular object to occupy the available portion of the display by shifting entries to form different rows of the tabular object in response to detecting the alteration to the size of the available portion of the display, wherein shifting the entries includes:
  identifying a position of each entry within a sequence of the entries in the tabular object; and
  traversing positions of a current set of columns of the tabular object for the entries to shift entries to another set of columns of the tabular object to occupy the available portion of the display, wherein the dynamically adjusted tabular object maintains a same order of the sequence of entries.

16. The computer program product of claim 15, wherein the computer executable instructions are further configured to:
  adjust a quantity of the sets of columns in the tabular object in response to manipulation of an actuator for the tabular object.

17. The computer program product of claim 15, wherein the display includes a plurality of panes, and computer executable instructions are further configured to:
  dynamically adjust a position of one or more rows within the tabular object in response to manipulation of one or more of the panes.

18. The computer program product of claim 15, wherein the computer executable instructions are further configured to:
  dynamically adjust a position of one or more rows within the tabular object in response to manipulation of an actuator for the tabular object.

19. The computer program product of claim 18, wherein:
  the manipulation of the actuator provides a scrolling operation;
  the position of each adjusted row is identified in accordance with a position sequence including traversing positions of a current set of columns prior to traversing positions of another set of columns within the tabular object;
  the adjusting maintains the same order of rows within the tabular object; and
  a quantity of rows becoming visible and hidden within the tabular object due to the adjusting is proportional to a quantity of the sets of columns in the tabular object.

20. The computer program product of claim 15, wherein the tabular object is floating on the display.

* * * * *